Patented Mar. 19, 1940

2,194,294

UNITED STATES PATENT OFFICE 2,194,294

PREPARATION OF N-SUBSTITUTED ALKYLOL AMINES

Oliver W. Cass and Robert T. K'burg, Niagara Falls, N. Y., assignors to E. I. du Pont de Nemours & Company, Wilmington, Del., a corporation of Delaware No Drawing. Application July 16, 1938, Serial No. 219,595

12 Claims. (Cl. 260—584)

This invention relates to the manufacture of N-alkyl-alkanolamines, and especially to the preparation of N-dialkyl-alkanolamines. More specifically the invention relates to the preparation of N-methyl-ethanolamines.

In the copending application of Robert W. Maxwell, Serial No. 219,603, filed July 16, 1938, there is disclosed a new process for the preparation of N-alkyl alkanolamines. The invention described herein represents a specific improvement over said process disclosed by Maxwell.

In a specific embodiment of Robert W. Maxwell's process, ethanolamine and formaldehyde are condensed by mixing the two at room temperature. Water is separated from the reaction product by adding benzol and distilling. The condensation product freed of water is then subjected to catalytic hydrogenation, thereby obtaining N-methyl-ethanolamine and N-dimethyl-ethanolamine, or merely the latter product if the proper proportions of ethanolamine and formaldehyde are condensed.

This invention has as its object the development of an improved process for making N-alkyl alkanolamines and, as a further object, the simplification and improvement of the process disclosed in the copending application of Robert W. Maxwell.

These objects are accomplished by the adoption of at least one of the following improvements in the process of condensing the aldehyde and alkanolamine and catalytically hydrogenating the product of condensation. These improvements constitute (1) carrying out the condensation of the aldehyde with an amino alcohol, in which the amino nitrogen atom has at least one functional hydrogen atom attached thereto and said nitrogen atom is attached to a carbon atom other than a carbon atom to which a hydroxyl group is attached, in the presence of an inert diluent such as benzene, cyclohexane, alcohol, etc.; (2) the hydrogenation of the mixture resulting from reacting the reactants, preferably in theoretical quantities without the separation of water; and (3) the hydrogenation at temperatures not exceeding 70° of the condensation product, especially when said condensation product is obtained directly from the condensation step and has admixed therewith water and the inert diluent. The adoption of any or all of the above improvements results in an increase in yield of the desired product and/or a simplification of the technique of the reaction.

The following examples are given for the purpose of illustrating the invention disclosed herein. These examples are not intended to limit the invention in any respect.

Example 1

Seven hundred and thirty-five grams ethanolamine was mixed with 500 cc. of benzene and placed in a suitable reaction vessel provided with stirring facilities and cooling coils. To this solution was then added 760 grams of paraformaldehyde at such a rate that the reaction temperature was maintained between 30° and 60° C. The paraformaldehyde went into solution smoothly and a light yellow mobile solution resulted. The total reaction time was two hours and thirty minutes. To this reaction mixture was then added 80 grams of nickel catalyst. The reaction vessel was closed, heated at 65° C., and subjected to hydrogenation at a hydrogen pressure of 1300 to 1200 pounds per square inch. By circulating water through the cooling coils, the reaction temperature was maintained between 65° and 70° C. Hydrogenation was completed in one hour and forty minutes. After cooling the reaction mixture, the excess hydrogen was then released. The product was filtered and placed in a suitable vessel connected to a fractionating column. The reaction mixture was then fractionated, first at atmospheric pressure until the cyclohexane and water were practically removed; then the pressure was reduced to 100 mm. and the N-dimethyl ethanolamine distilled out. There were secured by this procedure 929 grams of material boiling up to 60° C. at 100 mm., consisting primarily of cyclohexane and water, 14 grams of an intermediate fraction boiling between 60° and 70° C. at 100 mm. and 820 grams N-dimethyl-ethanolamine boiling between 70° and 85° C. at 100 mm., 98% of which distilled at a constant temperature of 78° C. There remained behind in the distillation vessel 288 grams of residue. This is a yield of 78% of the theoretical.

Example 2

In exactly the same way as in Example 1, a condensation product was prepared from 920 grams ethanolamine, 600 cc. of benzene, and 945 grams of paraformaldehyde. This condensation product was, however, hydrogenated at a slightly lower temperature, 60° to 65° C., and a slightly higher hydrogenation pressure, 1700 to 1500 pounds per square inch. With this modification in the hydrogenation procedure the amount of N-dimethyl-ethanolamine secured was increased to 1125 grams and the amount of residue decreased to 235 grams. This is an actual yield of 85% of the theoretical quantity. An additional 3% N-dimethyl-ethanolamine was secured by refractionation of the water, benzene and intermediate fractions, making a total recovery of 88% of the theoretical.

Our process may be practiced to obtain N-alkyl alkanolamines from any primary or secondary alkanolamine, the alkanol group of which contains an hydroxyl group attached to a carbon atom other than that carbon atom which is directly linked to the amino nitrogen atom. Thus, primary or secondary ethanolamines, 3-amino-propanol - 1, 4 - amino - butanol-1, 3-amino-2-methy-propanol-1, and the like substances, may be used in the practice of our invention. However, our process is most advantageously employed when applied to the preparation of N-alkyl alkanolamines from those primary or secondary alkanolamines which contain an hydroxyl group attached to the carbon atom which is directly linked to the carbon atom to which the amino nitrogen is attached. Such compounds, for example, are monoethanolamine, diethanolamine, monopropanolamine, dipropanolamine, N-methylethanolamine, N-methylpropanolamine, N-methylisobutanolamine, cyclohexanolamine, 1, 3-diamino-propanol-2, etc.

In general, however, the ethanolamines are most satisfactory for the reaction because of the great ease with which they condense with aldehydes. The term "ethanolamine" is not intended to include ethanolamines such as the aldehyde ammonias in which the hydroxyl and amino nitrogen are of the same carbon but does include those ethanolamines which are substituted in the chain with other carbon radicals such as methyl, ethyl, and phenyl groups.

The amine-aldehyde condensation product can be derived from a wide range of aldehydes. Broadly all aldehydes are suitable; however, the aliphatic aldehydes are preferred, particularly those derived from simple aldehydes such as isobutyraldehyde and formaldehyde. The use of formaldehyde is preferred above all others because of the great ease with which the condensation derivative is formed. Other aldehydes include benzaldehyde, butyraldehyde, propionaldehyde, valeraldehyde, and dodecanal. Unsaturated aldehydes such as crotonaldehyde and acrolein may also be used. It is preferred to use formaldehyde in the form of its polymer, paraformaldehyde.

In the condensation reaction any inert mobile diluent may be used. This diluent should be in sufficient quantities to reduce the viscosity of the mixture to such a point that complete condensation of two mols of aldehyde with one mol of amine can be carried out at a temperature not exceeding 60° C. with efficient agitation or stirring. It was found that if less amount of inert diluent were used, and it became necessary to increase the temperature of the condensation reaction to above 60° C. in order to make it mobile enough to stir, the yields of the desired product resulting from the catalytic hydrogenation of the condensation products were considerably lowered.

The use of the inert diluent is also of advantage in the hydrogenation step, especially when the hydrogen is brought in contact with the condensation product and catalyst by stirring the mixture. The diluent in reducing the viscosity of the mixture as pointed out above, enables the use of lower temperatures at which the effective agitation of the mixture may be secured. It has been found that the yield of the desired amines, such as N-dimethyl-ethanolamine, is greatly improved by the use of temperatures not exceeding and preferably less than 70° C. At temperatures greater than 80° C., tars are produced upon hydrogenation, and low yields of N-dimethyl-ethanolamine result.

We prefer to use benzene or cyclohexane as the diluent as they are of assistance in the separation of N-dimethyl-ethanolamine from the crude hydrogenation reaction products. The benzene is, of course, reduced to cyclohexane more or less completely the first time it is used, so that the actual diluent when repeatedly used is primarily cyclohexane, to which only sufficient benzene is added from time to time to compensate for handling losses. When this preferred diluent is used, the separation of N-dimethyl-ethanolamine from the crude hydrogenation product is easily carried out by fractionation. A cyclohexane-water azeotrope (B. P. 67° C.) is first secured upon fractionation, which is condensed and passed through a water separator. The cyclohexane is returned to the still boiler and recycled until all the water is removed. Then the cyclohexane is distilled off at 82° C. and the N-dimethyl-ethanolamine secured as the next fraction, boiling at 134° C. In case ethanol is used as a diluent, there is first secured a 95% ethanol-water fraction, boiling at 78° C. and then a water fraction, boiling at 100° C., and then N-dimethyl-ethanolamine. It is easier to separate the latter compound from a 82° C. boiling component (cyclohexane) than from a 100° C. boiling component (water). We have also found this advantage to exist when operating the fractionation column under reduced pressures, which is desirable to secure the highest yields of N-dimethyl-ethanolamine.

In the practice of our invention we have found that the highest yields of N-dimethyl-ethanolamine are secured when the condensation temperature lies between 30° and 60° C., and when the hydrogenation temperature does not exceed 65° to 70° C.

The pressure at which the hydrogenation reaction should be conducted does not appear to be particularly critical. Any pressure between atmospheric and the maximum pressure at which the apparatus can be safely operated may be used; preferably, the pressure should be within the range of from 2 to 200 atmospheres. The selection of the exact temperature and pressure which will give the highest yields of the desired amine depends to a great degree upon the type of hydrogenation catalyst used. For the hydrogenation reaction any hydrogenation catalyst may be considered operative; however, it is preferred to use metallic nickel or cobalt, either in the massive form or supported on such materials as kieselguhr and silica gel. Other types of hydrogenation catalysts that are practical for use in this reaction are platinum and the oxides and chromites of hydrogenating metals such as the cobalt, nickel, copper, etc. A very suitable catalyst for the hydrogenation reaction consists of active nickel in a concentration of from 0.5 to 5% by weight of the catalytic mass.

It is apparent that many widely different embodiments of this invention may be made without departing from the spirit and scope thereof and therefore it is not intended to be limited except as indicated in the appended claims.

We claim:

1. In the process for the production of an

N-alkyl alkanolamine by condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom other than a carbon to which a hydroxyl group is attached, followed by catalytically hydrogenating the condensation product, the improvement which comprises carrying out said condensation step with theoretical quantities of the reactants and in the presence of an inert diluent, and subjecting the resulting mixture to catalytic hydrogenation at a temperature sufficient to cause the reaction to proceed but not exceeding 70° C.

2. In the process for the production of an N-alkyl alkanolamine by condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom other than a carbon to which a hydroxyl group is attached, followed by catalytically hydrogenating the condensation product, the improvement which comprises carrying out said condensation step in the presence of an inert diluent and subjecting the resulting mixture to catalytic hydrogenation at a temperature sufficient to cause the reaction to proceed but not exceeding 70° C.

3. In the process for condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom other than a carbon to which a hydroxyl group is attached, the improvement which comprises carrying out the condensation reaction in the presence of an inert diluent.

4. In the process for catalytically hydrogenating the condensation product of an aldehyde selected from the group consisting of open-chain aliphatic aldehydes and an open-chain aliphatic amino alcohol in which the amino nitrogen atom has at least one functional hydrogen atom attached thereto and said nitrogen atom is attached to a carbon atom other than a carbon to which the hydroxyl group is attached, the improvement which comprises carrying out said reaction at a temperature sufficient to cause the reaction to proceed but not exceeding 70° C.

5. In the process for the production of an N-alkyl alkanolamine by condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom which is directly linked to a carbon to which a hydroxyl group is attached, followed by catalytically hydrogenating the condensation product, the improvement which comprises carrying out said condensation step with theoretical quantities of the reactants and in the presence of an inert diluent, and subjecting the resulting mixture to catalytic hydrogenation at a temperature sufficient to cause the reaction to proceed but not exceeding 70° C.

6. In the process for the production of an N-alkyl alkanolamine by condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom which is directly linked to a carbon to which a hydroxyl group is attached, followed by catalytically hydrogenating the condensation product, the improvement which comprises carrying out said condensation step in the presence of an inert diluent and subjecting the resulting mixture to catalytic hydrogenation at a temperature sufficient to cause the reaction to proceed but not exceeding 70° C.

7. In the process for condensing an aldehyde selected from the group consisting of open-chain aliphatic aldehydes and monocyclic aromatic aldehydes with an open-chain aliphatic amino alcohol in which the amino nitrogen atom has at least one functional hydrogen atom attached thereto and said nitrogen atom is attached to a carbon atom which is directly linked to a carbon to which a hydroxyl group is attached, the improvement which comprises carrying out the condensation reaction in the presence of an inert diluent.

8. In the process for catalytically hydrogenating the condensation product of an aldehyde selected from the group consisting of open-chain aliphatic aldehydes and monocyclic aromatic aldehydes and an open-chain aliphatic amino alcohol in which the amino nitrogen atom has at least one functional hydrogen atom attached thereto and said nitrogen atom is attached to a carbon atom which is directly linked to a carbon to which the hydroxyl group is attached, the improvement which comprises carrying out said reaction at a temperature sufficient to cause the reaction to proceed but not exceeding 70° C.

9. The process which comprises condensing an aldehyde selected from the group consisting of open-chain aliphatic aldehydes and monocyclic aromatic aldehydes with ethanolamine in the presence of an inert diluent and catalytically hydrogenating the resulting product at a temperature sufficient to cause the reaction to proceed but below 70° C.

10. The process in accordance with claim 9 characterized in that the aldehyde is formaldehyde.

11. The process in accordance with claim 9 characterized in that the aldehyde is paraformaldehyde and in an amount equivalent to two mols of paraformaldehyde for each mol of ethanolamine.

12. The process which comprises condensing two mols of paraformaldehyde with one mol of monoethanolamine in solution in benzene and catalytically hydrogenating the resulting product at a temperature sufficient to cause the reaction to proceed but below 70° C. to produce dimethyl-ethanolamine.

OLIVER W. CASS.
ROBERT T. K'BURG.